UNITED STATES PATENT OFFICE.

ARNO BEHR, OF JERSEY CITY, NEW JERSEY.

CRYSTALLIZED ANHYDROUS GRAPE-SUGAR.

SPECIFICATION forming part of Letters Patent No. 259,794, dated June 20, 1882.

Application filed March 13, 1882. (No specimens.)

*To all whom it may concern:*

Be it known that I, ARNO BEHR, of Jersey City, New Jersey, have invented an Improvement in Crystallized Anhydrous Grape-Sugar, of which the following is a specification.

My invention consists of a new article of manufacture—to wit, crystallized anhydrous grape-sugar produced from a watery solution of grape-sugar. The distinguishing characteristic of anhydrous grape-sugar thus produced is that it is free from the flavor of alcohol, which characterizes anhydride of grape-sugar crystallized from an alcoholic solution.

Prior to my invention it was known that crystallized anhydride of grape-sugar could be produced by dissolving grape-sugar in strong alcohol and crystallizing it from the alcholic solution; but in this process it is difficult to entirely free the resulting product from all traces of alcohol and from an unpleasant flavor resulting from impurities contained in commercial alcohol.

My improved product, which consists of pure crystallized anhydrous grape-sugar, entirely free from all traces of alcohol, may be made in various ways from watery solutions of grape-sugar.

I have heretofore described two methods of treating ordinary grape-sugar in the manufacture of anhydride of grape-sugar in Letters Patent of the United States No. 250,333 and No. 250,334, both issued to me December 6, 1881. The distinguishing characteristic of the methods described in the said patents consists in the concentration of the watery solutions of grape-sugar, and, in the case of the treatment of grape-sugar of comparatively low grade, in the introduction into the concentrated solution of a minute quantity of crystallized anhydrous grape-sugar, previously prepared, and in the exclusion from the solution of all traces of crystallized hydrate of grape-sugar. In the other case, in which previously-prepared crystallized anhydride of grape-sugar is not introduced into the solution, the grape-sugar which enters into the solution is required to be of great purity, so that the watery solution shall contain upward of ninety-five parts of pure grape-sugar in one hundred parts of dry substance. I have also described two modifications of these methods of treatment in two pending applications for patents, in one of which a method of treating grape-sugar of low grade by prolonging the period of crystallization is described, and the crystallized mass of grape-sugar is drained by placing the molds in which it has been crystallized in the basket of a centrifugal machine, which is adapted to receive them. In the other case the process of crystallization is prolonged in order to produce coarse crystals, and the crystallized mass is crushed and introduced in bulk into the basket of an ordinary centrifugal machine, by which draining is effected without difficulty, because of the coarseness of the crystals. The advantage of the latter method is mainly that it saves the labor and expense attendant upon the use of molds, and enables the manufacture to be carried on upon a larger scale by making it possible to drain a larger bulk of the crystallized material.

My crystallized anhydrous grape-sugar is not only remarkably sweet, but by its freedom from impurities, and especially its freedom from any traces of alcohol, is easily distinguishable.

I claim as my invention—

As a new article of manufacture, crystallized anhydrous grape-sugar, free from any trace or flavor of alcohol or its impurities, produced from a watery solution of grape-sugar.

ARNO BEHR.

Witnesses:
AUG. A. GOUBERT,
ROBT. MUELLER.